United States Patent
Ko et al.

(10) Patent No.: US 9,002,529 B2
(45) Date of Patent: Apr. 7, 2015

(54) POWER CONTROL METHOD AND DEVICE

(75) Inventors: Hee Sang Ko, Daejeon (KR); Jung Hoon Kim, Geoje-si (KR); Won Deok Baek, Daegu (KR); Tai Yeon Cho, Seongnam-si (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 65 days.

(21) Appl. No.: 13/513,326

(22) PCT Filed: Dec. 2, 2010

(86) PCT No.: PCT/KR2010/008583
§ 371 (c)(1),
(2), (4) Date: Jun. 1, 2012

(87) PCT Pub. No.: WO2011/068368
PCT Pub. Date: Jun. 9, 2011

(65) Prior Publication Data
US 2012/0277919 A1    Nov. 1, 2012

(30) Foreign Application Priority Data
Dec. 2, 2009 (KR) .................. 10-2009-0118431

(51) Int. Cl.
*G06F 19/00* (2011.01)
*H02J 3/50* (2006.01)
*H02J 3/16* (2006.01)

(52) U.S. Cl.
CPC ..... *H02J 3/50* (2013.01); *H02J 3/16* (2013.01); *Y02E 40/34* (2013.01)

(58) Field of Classification Search
USPC ............ 322/24; 323/282, 284; 327/218, 282; 363/65; 315/291; 700/286, 298
See application file for complete search history.

(56) References Cited

U.S. PATENT DOCUMENTS 6,984,965 B2 * 1/2006 Vinciarelli .............. 323/266
7,019,506 B2 * 3/2006 Kernahan .............. 323/284
(Continued)

FOREIGN PATENT DOCUMENTS

JP    2000358329 A    12/2000
(Continued)

OTHER PUBLICATIONS

International Search Report of PCT/KR2010/008583.
Chinese Office Action dated Apr. 28, 2014 for Chinese Application No. 201080055997.0.

*Primary Examiner* — M.N. Von Buhr
*Assistant Examiner* — Douglas S. Lee
(74) *Attorney, Agent, or Firm* — Edwards Wildman Palmer LLP; Jeffrey D. Hsi

(57) ABSTRACT

The present invention discloses a method and an apparatus for power control. An apparatus for power control in accordance with an embodiment of the present invention can include: a voltage comparing part configured to compute an error voltage by using a measured voltage measured at the generator and a reference voltage that is designated; a control module configured to compute a first reactive power value for power control of the generator by being inputted with the error voltage; and a driving module configured to compute a reference reactive power value by using the first reactive power value and a second reactive power value computed using an active power value of the power converter and configured to control the power converter in correspondence with the computed reference reactive power value.

8 Claims, 3 Drawing Sheets

(56) References Cited

U.S. PATENT DOCUMENTS

| | | | |
|---|---|---|---|
| 7,092,265 B2 * | 8/2006 | Kernahan | 363/65 |
| 7,663,348 B2 * | 2/2010 | Oohara et al. | 322/24 |
| 7,948,217 B2 * | 5/2011 | Oohara et al. | 322/24 |
| 2006/0279970 A1 * | 12/2006 | Kernahan | 363/65 |

FOREIGN PATENT DOCUMENTS

| | | |
|---|---|---|
| JP | 2007124779 A | 5/2007 |
| JP | 2008148373 A | 6/2008 |
| KR | 10-20090096849 A | 9/2009 |
| KR | 10-20090105342 A | 10/2009 |

* cited by examiner

POWER CONTROL METHOD AND DEVICE

CROSS REFERENCE TO RELATED APPLICATIONS

This application is the national phase under 35 U.S.C. §371 of PCT International Application No. PCT/KR2010/008583, filed Dec. 2, 2010, which claims the benefit of Korean Patent Application No. 10-2009-0118431, filed Dec. 2, 2009, the entire contents of the aforementioned applications are hereby incorporated herein by reference.

TECHNICAL FIELD

The present invention relates to an apparatus and a method for power control, more specifically to an apparatus and a method for power control of a wind power generation system that controls reactive power of a power converter of a wind power generation system.

BACKGROUND ART

Wind power generation, which is a pollution free energy source in a natural state and is the most economical energy source among the currently available alternative energy sources, is a technology that directly supplies electric power generated by converting wind power to rotary power to an electric power system or consumers. This wind power generation can utilize mountains, the hinterland levees and other lots, enhancing the efficiency of utilizing the national land.

A wind power generation system refers to a system that uses various forms of windmills to convert wind energy to mechanical energy and drives a generator with this mechanical energy to obtain electric power. Such a wind power generation system is a pollution free power generation system that has no thermal pollution, air pollution or radioactive contamination, unlike conventional power generation systems that use fossil fuel or uranium, since the power is driven by wind, which is an infinite source of clean energy.

The wind power generation system supplies the electric power by being linked with conventional commercial electric power system, in which case stability and efficiency of system connection is very important.

In order to promote the stability in system operation, the wind power generation system has been solving the problem of voltage drop at the point of system connection by additionally installing a capacitor bank.

However, in the conventional wind power generation system, the capacitor bank has had low response and precision and has not been able to be controlled continuously, thereby failing to compensate sudden voltage fluctuation.

DISCLOSURE

Technical Problem

Contrived to solve the above problems of the conventional technology, the present invention provides a method and an apparatus for controlling electric power that improve the quality of electric power of a generator by controlling reactive power of a power converter connected with the generator.

Technical Solution

An aspect of the present invention features an apparatus for power control of a power generation system.

An apparatus for power control in accordance with an embodiment of the present invention can include: a voltage comparing part configured to compute an error voltage by using a measured voltage measured at a generator and a reference voltage that is designated; a control module configured to compute a first reactive power value for power control of the generator by being inputted with the error voltage; and a driving module configured to compute a reference reactive power value by using the first reactive power value and a second reactive power value computed using an active power value of the power converter and configured to control the power converter in correspondence with the computed reference reactive power value.

Another aspect of the present invention features a method for controlling electric power in a power generation system.

A method for controlling electric power in accordance with an embodiment of the present invention can include: computing an error voltage by using a measured voltage measured at a generator and a reference voltage of the generator; computing a first reactive power value by being inputted with the error voltage; computing a reference reactive power value by using the first reactive power value and a second reactive power value computed using an active power value of the power converter; and controlling the power converter in correspondence with the computed reference reactive power value.

MODE FOR INVENTION

The object, technical configuration and effects of the present invention will become clearly understood through the below description with reference to the drawings that illustrate a preferred embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain technology is determined to evade the point of the present invention, the pertinent detailed description will be omitted.

Hereinafter, some embodiments of the present invention will be described with reference to the accompanying drawings.

Figure 1:
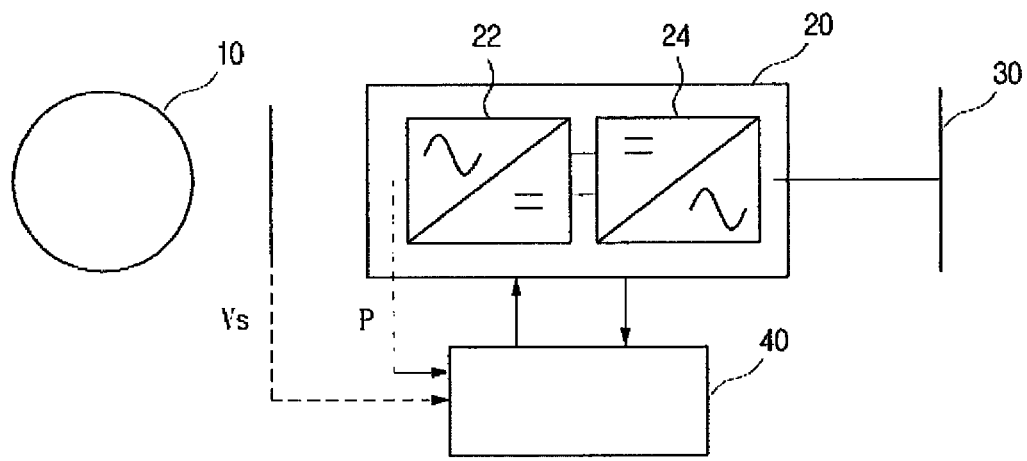
FIG. 1 shows the configuration of a power generation system in accordance with an embodiment of the present invention.
Figure 2:
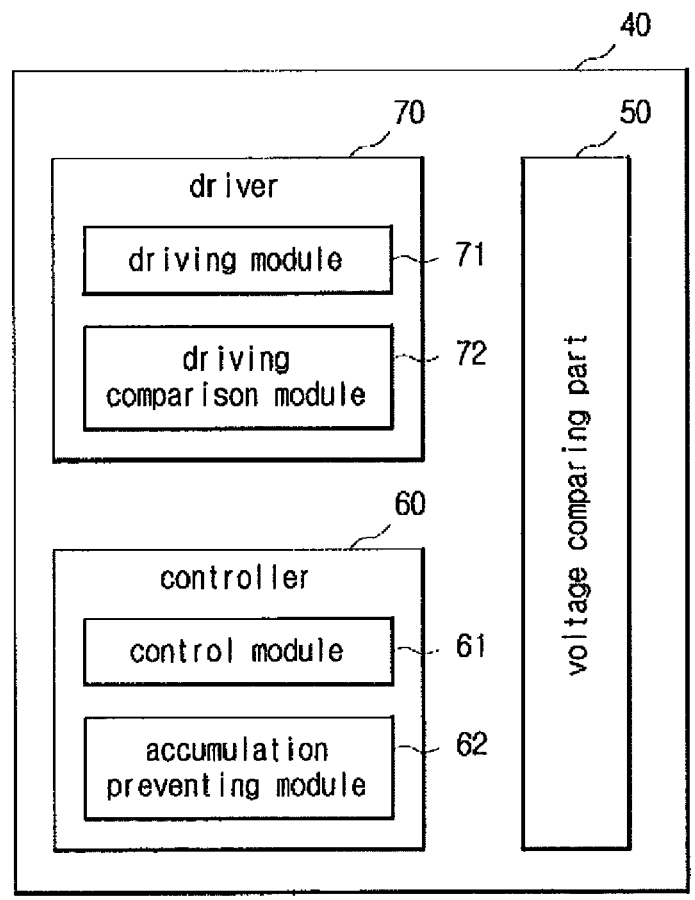
FIG. 2 is a block diagram of an electric power control device in accordance with an embodiment of the present invention.

FIG. 1 shows the configuration of a power generation system in accordance with an embodiment of the present invention, and FIG. 2 is a block diagram of an electric power control device in accordance with an embodiment of the present invention.

Referring to FIG. 1, the power generation system in accordance with the present invention can include a generator 10, a power converter 20, an electric power system network 30 and an electric power control device 40.

The generator 10 uses various forms of windmills to covert wind energy to mechanical energy and uses the mechanical energy to produce electric power.

The power converter 20, which is connected to the generator 10, is a power conversion device that can steadily supply the electric power produced by the generator 10 to the electric power system network 30.

Here, the power converter 20 can include a converter 22 that coverts alternating current to direct current and an inverter 24 that converts direct current to alternating current. The power converter 20 can output a more reliable quality of electric power to the electric power system network 30 by using the converter 22 and the inverter 24 to convert unstable electric power produced by the generator 10 to a steady output.

The electric power system network 30, which is connected to the power converter 20, is a means for supplying the electric power, which is supplied from the generator 10 through the power converter 20, to a commercial electric power system (not shown), which substantially supplies the electric power to consumers.

The electric power control device 40 can compute an error voltage (ev) by using a measured voltage (Vs) that is measured at the side of a stator of the generator 10 and compute a first reactive power value (Qp) by using the computed error voltage.

Here, the first reactive power value (Qp) will be later described in detail with reference to Formula 1.

Moreover, the electric power control device 40 can compute a second reactive power value (Qt) by using an active power value measured at the power converter 20. The second reactive power value will be described later in detail with reference to Formula 2.

Furthermore, the electric power control device 40 can compute a reference reactive power value (Qset) by using the computed first reactive power value (Qp) and second reactive power value (Qt). The electric power control device 40 can also control reactive power of the power converter 20 based on the computed reference reactive power value (Qset). This will be described later in detail with reference to FIG. 2 to FIG. 4.

Hereinafter, the configuration of the electric power control device 40 will be described in detail with reference to FIG. 2.

According to an embodiment of the present invention, the electric power control device 40 can include a voltage comparing part 50, a controller 60 and a driver 70, as illustrated in FIG. 2.

The voltage comparing part 50 can compute the error voltage (ev) based on a difference between the a measured voltage (Vs) measured at the side of the stator of the generator 10 and a reference voltage (Vs_ref) at the side of the stator of the generator 10. Here, the reference voltage (Vs_ref) is voltage for steadily supplying good voltage and can be pre-set by an operator.

The controller 60 can include a control module 61 and an accumulation preventing module 62.

The control module 61 can compute the first reactive power value (Qp), which is required for power control on the stator side of the generator, by performing a linear control for the error voltage (ev). The method of computing the first reactive power value (Qp) will be described in detail with reference to FIG. 3.

The accumulation preventing module 62 can prevent an accumulation phenomenon of the control module 61. This will be described in detail with reference to the accumulation preventing module 62 shown in FIG. 4.

The driver 70 can include a control module 61 and a driving comparison module 72.

According to an embodiment of the present invention, the driver 70 can compute the second reactive power value (Qt) by using the active power value measured at the power converter 20. The second reactive power value will be described later in detail with reference to Formula 2.

The driving module 71 can compute the reference reactive power value (Qset) by comparing the first reactive power value (Qp), which is computed through the control module 61 of the controller 60, and the second reactive power value (Qt), which is computed using an active power value (P) of the power converter 20, and control the power converter 20 in accordance with the reference reactive power value (Qset). This will be described later in detail with reference to FIG. 3.

The driving comparison module 72 can compute a deviation signal (es) based on a difference between the reference reactive power value (Qset) and the first reactive power value (Qp) computed by the control module 61.

Use of the deviation signal (es) in accordance with an embodiment of the present invention will be described later in detail with reference to the accumulation preventing module 62 shown in FIG. 3.

Figure 3:
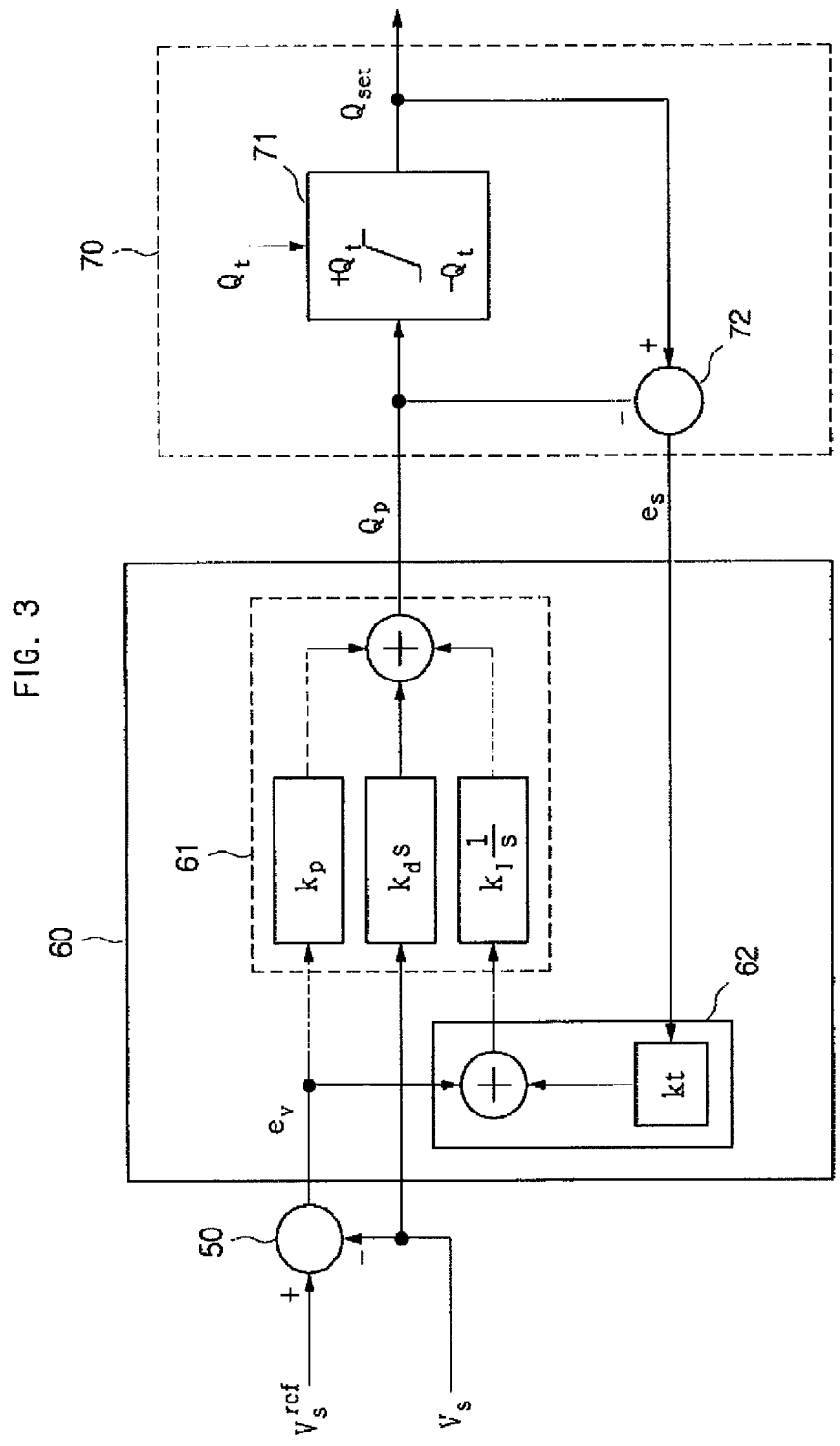
FIG. 3 illustrates a control part and a driving part of the power generation system using power control in accordance with an embodiment of the present invention.
Figure 4:
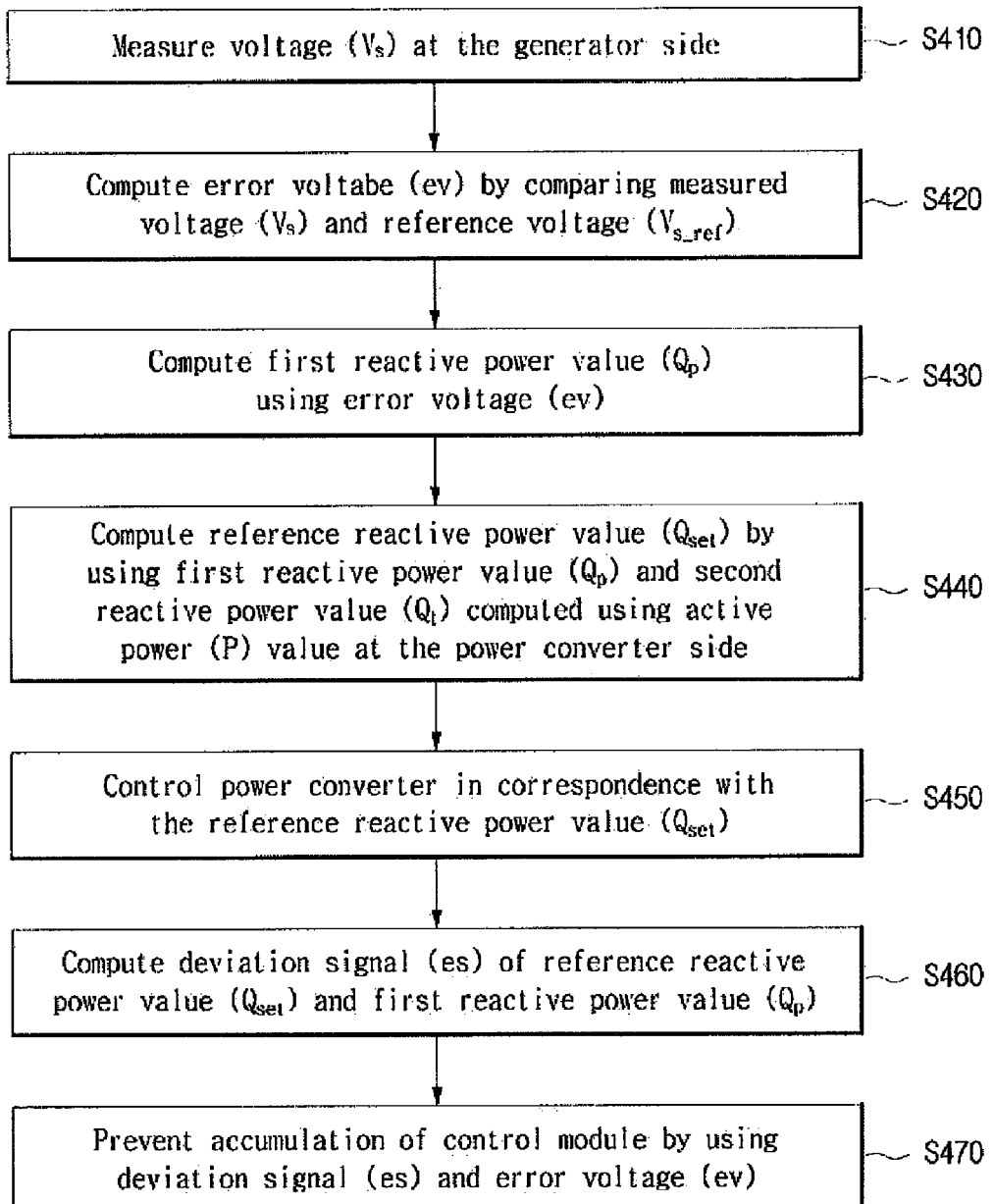
FIG. 4 is a flow diagram illustrating a method of power control of the power generation system in accordance with an embodiment of the present invention.

The power generation system using power control in accordance with an embodiment of the present invention will be understood more clearly by the description with reference to FIGS. 3 and 4.

FIG. 3 illustrates a control part and a driving part of the power generation system using power control in accordance with an embodiment of the present invention.

Referring to FIG. 3, the controller 60 in accordance with an embodiment of the present invention can include the control module 61 and the accumulation preventing module 62.

The control module 61 can be any one of a proportional integral (PI) control module, a proportional derivative (PD) control module and a proportional integral derivative (PID) control module that feed back and control an output value.

For example, as illustrated in FIG. 3, the control module 61 in accordance with an embodiment of the present invention can be the PID control module that encompasses all advantages of a proportional control module (P), an integral control module (I), which improves a normal-state response, and a derivative control module (D), which improves a response speed.

FIG. 3 is only an embodiment for better understanding of the present invention, and it shall be appreciated by those who are skilled in the art in the light of the technical ideas of the present invention that the control module 61 can be any one of the PD control module, the PI control module and the PID control module, depending on an environment to which the present invention is applied.

According to an embodiment of the present invention, the control module 61 can first carry out a step of multiplying a proportional gain ($k_p$) to the error voltage (ev) if the error voltage (ev) is inputted to the proportional control module (P).

Moreover, the control module 61 can carry out a step of having the measured voltage (Vs), which is measured at the side of the stator of the generator 10, inputted to the derivative control module (D) and differentiated and then multiplied by a derivative gain ($k_d$).

The control module 61 can also carry out a step of multiplying an integral gain ($k_i$) through integration if the error voltage (ev) is inputted to the integral control module (I).

Then, the control module 61 can compute the first reactive power value (Qp) by adding output signals outputted, respectively, from the proportional control module (P), the integral control module (I) and the derivative control module (D).

Next, the accumulation preventing module 62 can control the control module 61 based on the deviation signal (es) that is fed back through the driver 70.

The accumulation preventing module 62 prevents an accumulation phenomenon caused by a difference between an, input terminal and an output terminal when operating the control module 61 such as the PI control module or the PID control module that includes the integral control module (I). The accumulation phenomenon can deteriorate the performance of the control module 61 by lowering transient response characteristics and normal-state response characteristics.

Therefore, an embodiment of the present invention has the accumulation preventing module 62 additionally and provides an accumulation preventing function to prevent the control module 61 including the integral control module from malfunctioning.

Hereinafter, the accumulation preventing module 62 will be described in more detail.

The accumulation preventing module 62 can multiply a tracking time constant (kt) to the deviation signal (es) computed by comparing the first reactive power value (Qp), which is computed by the control module 61, with the reference reactive power value (Qset), which is the output value of the driving module 71.

Here, if the driver 70 is not saturated, the deviation signal (es) is 0, and thus the value obtained by multiplying the tracking time constant (kt) in the accumulation preventing module 62 may not affect the control module 61.

On the other hand, if the driver 70 is saturated, the deviation signal can be generated, i.e., es≠0. In such a case, in accordance with an embodiment of the present invention, the accumulation preventing module 62 can prevent accumulation by reducing the input of the integral control module (I) in the control module 61 by a feedback route.

The driver 70 in accordance with an embodiment of the present invention can be constituted with the driving module 71 and the driving comparison module 72.

The driving module 71 can compute the reference reactive power value (Qset) for controlling the power converter 20 by comparing the second reactive power value (Qt), which is computed using an active power (P) value measured at the power converter 20, with the first reactive power value (Qp), which is computed by the control module 61.

Moreover, the driving module 71 can provide the computed reference reactive power value (Qset) as a control signal to the electric power control device 40, which can then use the control signal to control the power converter 20. According to an embodiment of the present invention, the power converter 20 can be a converter.

The driving module 71 can compute the reference reactive power value (Qset), which is a surplus of the reactive power in preparation for the active power of the power converter 20, through the following Formula 1.

$$Qset = \min{Qt, Qp} \quad \text{<Formula 1>}$$

Here, the Qset is the reference reactive power value, and the Qt is the second reactive power value that is calculated using the active power (P) value measured at the power converter 20 and can be computed using the following Formula 2. The Qp is the first reactive power value outputted by the controller 60.

$$Qt = \max((P/PF)^2 - P^2)^{1/2}, (1-P^2)^{1/2} \quad \text{<Formula 2>}$$

Here, P is the measured active power value of the power converter 20, and PF is a power factor value of the power converter 20. If the maximum power factor (PF) is predetermined to be 95%, the PF value in Formula 2 is 0.95.

The second reactive power value (Qt) can be a real number included in a range between a maximum reactive power value (+Qt) that can be supplied by the converter of the power converter 20 and a maximum reactive power value (−Qt) that can be absorbed by the converter of the power converter 20.

In the above Formula 1, mina,b means that a smaller value between a and be is taken, and in the above Formula 2, maxa,b means that a bigger value between a and be is taken.

FIG. 4 is a flow diagram illustrating a method of power control of the power generation system in accordance with an embodiment of the present invention.

It has been described earlier with reference to FIG. 1, that the power generation system in accordance with an embodiment of the present invention can include the generator 10, the power converter 20, the electric power system network 30 and the electric power control device 40.

Moreover, it has been described with reference to FIGS. 2 and 3 that the electric power control device 40 that controls electric power of the power converter 20 in accordance with an embodiment of the present invention can include the voltage comparing part 50, the controller 60 and the driver 70, each of which has been also described.

However, the configuration of the electric power control device 40 illustrated in FIGS. 2 and 3 is only one embodiment, and the names and functions are not restricted to what have been described herein but can be configured in various ways. Accordingly, the following description with reference to FIG. 4 will be based on the electric power control device 40. The structure of the electric power control device 40 being connected with the generator 10, the power converter 20 and the electric power system network 30 will be described for the embodiment that referred to FIGS. 1 to 3.

Referring to FIG. 4, in S410, the electric power control device 40 can compute the measured voltage (Vs) by measuring a voltage at the side of the stator of the generator 10 that supplies electric power to the power converter 20.

In S420, the electric power control device 40 can compute the error voltage (ev) based on the difference between the measured voltage (Vs) and the reference voltage (Vs_ref) at the side of the stator of the generator. This has been described earlier with reference to the voltage comparing part 50 in FIGS. 2 and 3.

In S430, the electric power control device 40 can compute the first reactive power value (Qp) by performing a linear control of the error voltage (ev) that is computed in S420. This has been described earlier with reference to the control module 61 of FIG. 2 and the embodiment of the proportional integral derivative (PID) control module in FIG. 3.

In S440, the electric power control device 40 can compute reference reactive power value (Qset) by using the first reactive power value (Qp) computed in S430 and the second reactive power value (Qt) computed using the active power value measured at the power converter 20. This has been described earlier with reference to Formula 2.

In S450, the electric power control device 40 can control the power converter 20 in correspondence with the computed reference reactive power value (Qset). Therefore, according to an embodiment of the present invention, the power converter 20 can control the connected generator 10 to steadily maintain the voltage at the side of the stator of the generator, thereby operating the entire power generation system stably.

In S460, the electric power control device 40 can compute the deviation signal (es) based on the reference reactive power value (Qset) and the first reactive power value (Qp) computed by the control, module 61.

In S470, the electric power control device 40 can prevent the accumulation phenomenon by using the error voltage (ev) value and a value in which the deviation signal (es) and the tracking time constant (kt) are multiplied.

As a result, the electric power control device 40 can control the output voltage and improve the power factor of the generator by controlling the reactive power of the power converter 20 and furthermore can prevent the wind power generator from breaking from the system.

Moreover, the present invention can realize a reliable and efficient power generation system without incorporating an additional device or process, thereby achieving a stable quality of electric power and a reliable operation of the power generator.

Particularly, the present invention can be universally applied regardless of the size of the power converter 20 and the generator 10 having the power converter 20.

The embodiment of the present invention can include a computer-readable medium that includes program commands for performing various computer-realized operations. The computer-readable medium can include a program command, a local data file and a local data structure or combinations thereof. It is possible that the medium is specifically designed and configured for this particular invention or is well known and usable among those who are skilled in computer software.

The above detailed description with reference to the accompanying drawings is not restricted to the described embodiment and can be variously permuted and/or modified without departing from the technical ideas of the present invention by those who are skilled in the art to which the present invention pertains.

INDUSTRIAL APPLICABILITY

Therefore, the present invention can improve the power factor by controlling the reactive power of the power converter and furthermore can prevent the generator from breaking from the system.

Moreover, the present invention can realize a reliable and efficient power generation system without incorporating an additional device or process, thereby achieving a stable quality of electric power and a reliable operation of the power generator.

The invention claimed is:

1. An apparatus for power control configured to control reactive power of a power converter converting power produced by a generator, the apparatus comprising:
    a voltage comparing part configured to compute an error voltage by using a measured voltage measured at the generator and a reference voltage that is designated;
    a control module configured to compute a first reactive power value for power control of the generator by being inputted with the error voltage; and
    a driving module configured to compute a reference reactive power value by using the first reactive power value and a second reactive power value computed using an active power value of the power converter and configured to control the power converter in correspondence with the computed reference reactive power value,
    wherein the reference reactive power is computed by Formula 1, the reference reactive power value being a surplus of reactive power in preparation for active power of the power converter $$Qset = \min Qt, Qp \qquad \text{<Formula 1>}$$

whereas the Qset is the reference reactive power value, and the Qp is the first reactive power value, and the Qt is the second reactive power value,
wherein the second reactive power value is computed by Formula 2

$$Qt = \max((P/PF)^2 - P^2)^{1/2}, (1-P^2)^{1/2} \qquad \text{<Formula 2>}$$

whereas the P is an active power value of the power converter, and the PF is a power factor of the power converter.

2. The apparatus for power control of claim 1, further comprising:
    a driving comparison module configured to compute a deviation signal by using the first reactive power value and the computed reference reactive power value; and
    an accumulation preventing module configured to prevent accumulation of the control module by using the computed deviation signal and the error voltage.

3. The apparatus for power control of claim 1, wherein the control module is any one of a proportional integral (PI) control module, a proportional derivative (PD) control module and a proportional integral derivative (PID) control module that are configured to perform a linear control by being inputted with the error voltage.

4. The apparatus for power control of claim 1, wherein an upper value of the power factor is 0.95.

5. The apparatus for power control of claim 1, wherein the control module is a proportional integral derivative (PID) control module configured to perform a linear control by being inputted with the error voltage,
    wherein a proportional control module (P) of the PID control module outputs a first output value by being inputted with the error voltage and multiplying a proportional gain to the error voltage,
    wherein an integral control module (I) of the PID control module outputs a second output value by being inputted with the error voltage and integrating the error voltage and multiplying an integral gain,
    wherein a derivative control module (D) of the PID control module outputs a third output value by being inputted with the measured voltage and differentiating the measured voltage and multiplying a derivative gain, and
    wherein the first reactive power value is computed using the first output value, the second output value and the third output value.

6. A method for controlling electric power of a power converter configured to convert the electric power produced by a generator, the method being performed by an electric power control device, the method comprising:
    computing an error voltage by using a measured voltage measured at the generator and a reference voltage of the generator;
    computing a first reactive power value by being inputted with the error voltage;
    computing a reference reactive power value by using the first reactive power value and a second reactive power value computed using an active power value of the power converter; and
    controlling the power converter in correspondence with the computed reference reactive power value, wherein the computing of a reference reactive power value by using the first reactive power value and a second reactive power value is performed using Formula 1

$$Qset = \min Qt, Qp \qquad \text{<Formula 1>}$$

whereas the Qset is the reference reactive power value, and the Qp is the first reactive power value, and the Qt is the second reactive power value, wherein the second reactive power value is computed by Formula 2

$$Qt = \max((P/PF)^2 - P^2)^{1/2}, (1-P)^{1/2} \qquad \text{<Formula 2>}$$

whereas the P is active lower value o the power converter, and the PF is a power factor of the power converter.

7. The method of claim 6, further comprising:
computing a deviation signal by using a sum of the first reactive power value and a sum of the computed reference reactive power value; and
preventing accumulation of the control module by using the computed deviation signal and the error voltage.

8. The method of claim 6, wherein an upper value of the power factor is 0.95.

\* \* \* \* \*